US008320636B2

(12) United States Patent
Weiss

(10) Patent No.: US 8,320,636 B2
(45) Date of Patent: Nov. 27, 2012

(54) DETECTING IMAGE DETAIL LEVEL

(75) Inventor: Benn Weiss, Carpinteria, CA (US)

(73) Assignee: Apple Inc., Cupertino, CA (US)

( * ) Notice: Subject to any disclaimer, the term of this patent is extended or adjusted under 35 U.S.C. 154(b) by 977 days.

(21) Appl. No.: 12/360,110

(22) Filed: Jan. 26, 2009

(65) Prior Publication Data

US 2010/0172549 A1 Jul. 8, 2010

Related U.S. Application Data

(60) Provisional application No. 61/142,606, filed on Jan. 5, 2009.

(51) Int. Cl.
*G06K 9/00* (2006.01)
(52) U.S. Cl. ........ 382/112; 382/365; 382/255; 382/286; 348/207.99; 348/208.99
(58) Field of Classification Search .................. None
See application file for complete search history.

(56) References Cited

U.S. PATENT DOCUMENTS

2003/0179911 A1 9/2003 Ho et al.
2003/0185424 A1* 10/2003 Sato et al. ..................... 382/118
2006/0115174 A1* 6/2006 Lim et al. ...................... 382/260
2007/0237364 A1* 10/2007 Song et al. ..................... 382/115
2008/0013851 A1* 1/2008 Ishiwata et al. ............... 382/255

OTHER PUBLICATIONS

Hu et al. "Low Cost Robust Blur Estimator", Oct. 2006, IEEE, pp. 617-620.*
Hu et al. "Adaptive Image Restoration Based on Local Robust Blur Estimation", 2007, Springer, pp. 461-472.*
Authorized Officer Athina Nickitas-Etienne, Notification Concerning Transmittal of International Preliminary Report on Patentability (Chapter 1 of the Patent Coo9peration Treaty), International Application No. PCT/US2010/020141 mailed Jul. 14, 2011, 7 pages.

* cited by examiner

*Primary Examiner* — Matthew Bella
*Assistant Examiner* — Jason Heidemann
(74) *Attorney, Agent, or Firm* — Wong, Cabello, Lutsch, Rutherford & Brucculeri, L.L.P.

(57) ABSTRACT

One aspect of the subject matter described in this specification can be implemented in a method for detecting a detail level of an image including receiving an original image, transforming the original image to generate one or more blurred images, deriving image differences corresponding to ranges of detail frequency of the original image based, at least in part, on the one or more blurred images and the original image, determining, based on the image differences, a detail level value corresponding to the original image, and providing the detail level value to an image management application.

21 Claims, 7 Drawing Sheets

DETECTING IMAGE DETAIL LEVEL

DETECTING IMAGE DETAIL LEVEL

This application claims the benefit of U.S. Provisional Application No. 61/142,606, filed Jan. 5, 2009.

TECHNICAL FIELD

The present disclosure relates to detecting image detail level, such as to indicate whether an image contains recognizable details.

BACKGROUND

Digital photography, a popular pastime, utilizes digital technology to produce digital images. Digital images (or "images") also can be created, for example, by graphical editing software (e.g., photo editing or drawing software), digital video equipment, and scanners.

After production, an original image (e.g., a photograph) can be processed in many ways. Some instances of image processing can produce a new image from an original image. For example, cropping (i.e., extracting a portion of an image) and transforming (e.g., convolving an image with a convolution kernel) can produce a new image from an original image. Other instances of image processing can ascertain information about an original image without producing a new image. For example, facial-detection processing can determine whether an image depicts one or more faces.

Images (e.g., photographs) can depict one or more subjects, such as people or objects, with varying levels of detail. A sharp image, having a high level of detail, can include visual features (e.g., fine details of a flower) that would not be discernible in an image with a comparatively low level of detail. Further, image detail can correspond to image components of varying frequencies (e.g., high frequency or low frequency).

SUMMARY

This disclosure describes technologies and techniques for detecting image detail levels.

The present inventors recognized a need to assess the accuracy of a detection made by a facial detection system. Further, the need to determine whether an image includes sufficient detail to perform an accurate facial recognition process also was recognized. Additionally, the need to eliminate blurry images having fewer high frequency image components relative to low frequency image components in an overall facial correlation system was recognized. In addition, the need to eliminate facial detections in images not corresponding to facial representations in an overall facial correlation system was recognized.

In general, one aspect of the subject matter described in this specification can be implemented in a method that includes receiving an original image; transforming the original image to generate one or more blurred images; deriving image differences corresponding to ranges of detail frequency of the original image based, at least in part, on the one or more blurred images and the original image; determining, based on the image differences, a detail level value corresponding to the original image; and providing the detail level value to an image management application.

These and other implementations can optionally include one or more of the following features. The generating the one or more blurred images can include generating blurred images by successively and cumulatively transforming the original image. The transforming the original image can include convolving the original image using a kernel configured to graphically blur an image. The deriving the image differences can include averaging absolute corresponding pixel differences between one of the one or more blurred images and the original image. The deriving the image differences can include comparing single color channels of the one or more blurred images and the original image. The deriving image differences further can include deriving a high frequency difference, a medium-high frequency difference, a medium-low frequency difference, and a low frequency difference. The determining the detail level value further can include dividing a lowest high frequency value selected from the high frequency difference and the medium-high frequency difference by a highest low frequency value selected from the medium-low frequency difference, the low frequency difference, and a constant value representing substantially zero frequency difference. The original image can be received from the image management application; and the provided detail level value can indicate a likelihood of the original image depicting a face recognizable by the image management application.

The techniques described in this specification can be implemented to realize one or more of the following advantages. The accuracy of facial detection and recognition can be improved by eliminating images having insufficient detail (e.g., non-facial image data or unclear facial image data). Aspects of image detail level detection (e.g., image transformation and image comparison) can permit efficient implementations (e.g., detecting perceptible detail at an 8-bit image depth rather than a higher depth). Efficient implementations can increase overall processing-resource efficiency and can be used in real-time systems.

One or more of the following additional advantages also can be realized. Using one color channel for image detail level detection rather than more than one color channel included in the original image can provide several advantages. For example, using one channel can decrease the image data (e.g., an 8-bit grayscale image rather than a 24-bit color image) to be processed thus decreasing the computing resources required. In another example, a given channel (e.g., the green or red channel) can include less noise than the original image improving the quality of the detail level detection.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Facial detection includes processing to detect one or more faces in an image. Further, facial detection can include identifying one or more areas of an image in which a face is believed to appear. Facial recognition, in contrast, can include determining, based on a detected face, which person is represented.

Certain detection conditions can result in unreliable facial recognition. For example, a detected face, such as a face in a background of an image, can lack sufficient detail to enable accurate recognition. In a second example, an area in which a face has been "detected" can actually correspond to image data that represents something other than a face (e.g., clouds or leaves on a tree).

Determining an image detail level can assist in recognizing detection conditions likely to lead to unreliable facial recognition. An area of an image in which a detected face is believed to appear can be processed to assess the level of image detail. For example, the area can be extracted from the image as a new, smaller image. A value (or score) can be generated that reflects the level of image detail of the area.

A component of the level of detail in an image can relate to a sharpness quality of the image. Sharpness can be a measure of a change in luminosity divided by a change in distance. Luminosity can refer to the intensity or brightness of image depictions. Distinguishing between luminosity changes that indicate sharpness and changes that do not indicate sharpness can improve the accuracy of detecting image detail level.

Figure 1:
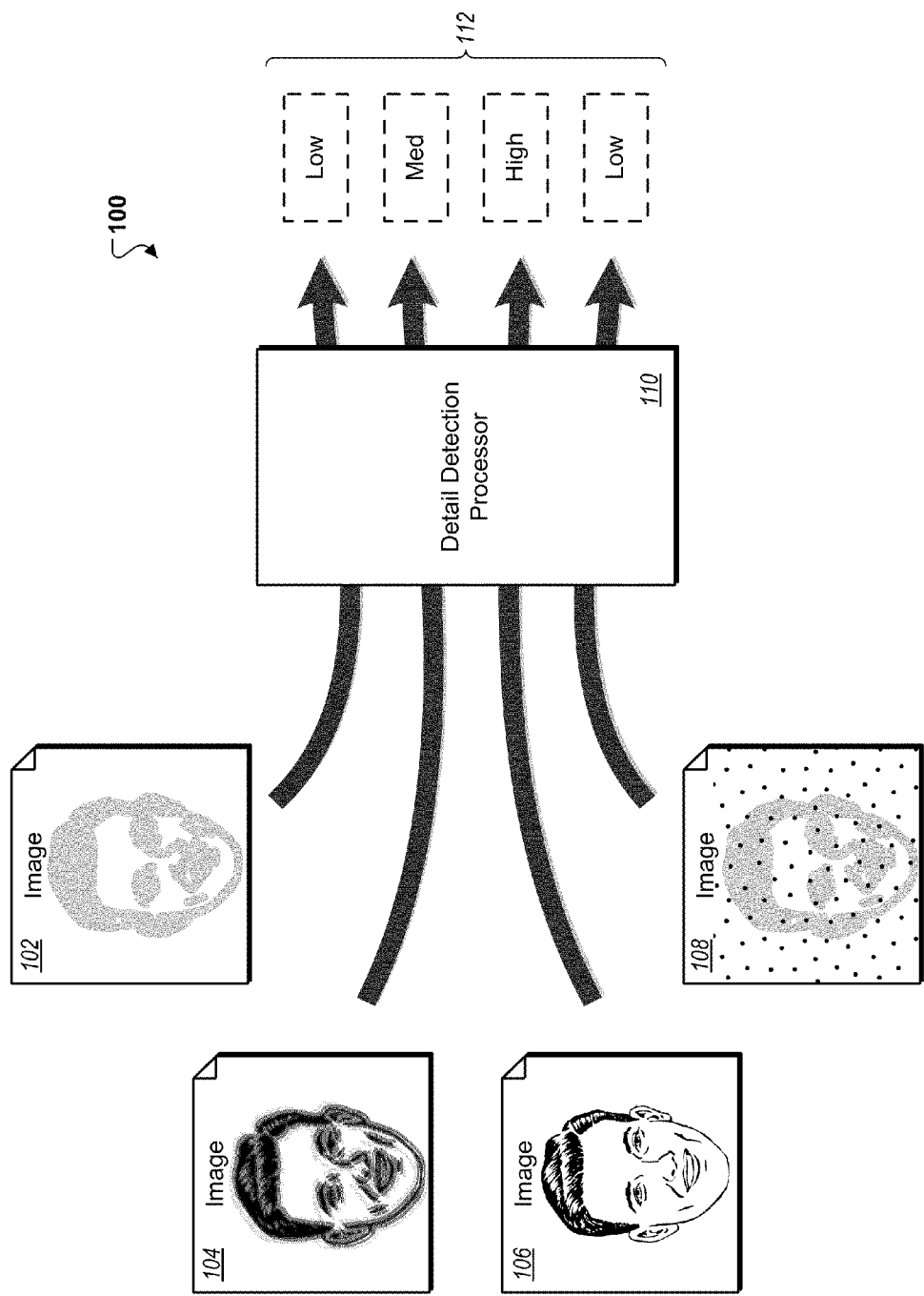
FIG. 1 shows an exemplary overview of detecting image detail levels.

In some instances, as represented in FIG. 1, an image or portion thereof can clearly depict a given subject matter. For example, an image (e.g., a photograph) of a person's face can show facial features, such as the eyes, nose, and mouth that enable a person or facial recognition process to recognize the person depicted. In other instances an image or portion thereof can depict a given subject in an unclear manner. For example, the lack of detail can result from a photograph being blurry (e.g., out of focus), washed out (e.g., overexposed), distorted (e.g., noisy), or blank. Further, the lack of detail can prevent a person or facial recognition process from recognizing what an image depicts. Thus, image detail detection processing can be performed to determine either or both of the clarity and accuracy of an image's depictions.

FIG. 1 shows an exemplary overview 100 of detecting image detail levels. A washed-out image 102, a blurry image 104, a clear image 106 and a noisy image 108 shown in the overview 100 can be digital images that represent a subject (e.g., a person or physical object), and also can be still images (e.g., photographs) or frames from a video source. The images (e.g., the washed-out image 102 can be portions extracted from one or more larger images.

In general, the washed-out image 102 depicts a face with relatively little detail (e.g., the white of the eyes and teeth are not visible). The lack of detail in the washed-out image 102 can be caused by various factors. For example, the face may have been too bright relative to the exposure level of a camera producing the washed-out image 102. Other photographic defects, such as aberrations of camera optics (e.g., astigmatism), also can result in unclear images.

With respect to image characteristics, the washed-out image 102 can represent an image that, in a frequency domain representation, has a relatively low ratio of high frequency to low frequency components. In contrast, an image that has a relatively high ratio of high frequency to low frequency image components can be perceived as having a sharp appearance. The lack of high frequency image data in the washed-out image 102 can result in edges and fine details (e.g., the eyes of the person) being more difficult to perceive or detect relative to an image having a higher ratio. The washed-out image 102 can, however, have low frequency image components such that the general shape of the person's face is represented.

A blurry image 104 depicts a face having details which are distorted or unclear due to blurring. The blurring can result from the face not having been in focus (e.g., a part of the background) when the blurry image 104 was captured. Focus can refer to the convergence of light from the subject, e.g., in the optical systems of a camera. The blurring also can result from, e.g., camera or subject movement, image processing or too little resolution to approximate the features of the face.

The blurry image 104 can include more detail than the washed-out image 102. For example, the ratio of high frequency to low frequency components can be higher for the blurry image 104, resulting in more clarity. However, the blurry image 104 nonetheless can be undesirable or of low quality because the face depicted lacks sharpness.

A clear image 106 depicts a face with many perceptible details. For example, details, such as of the hair, eyes, mouth, and facial shape, can be clearly perceived and distinguished from other details. The clear image 106 can include sufficient high frequency and low frequency components to enable identity recognition, e.g., by a person or computer recognition system.

A noisy image 108 depicts a face with relatively little detail that includes noise (e.g., camera noise or film grain). The noise can be random variation in brightness or color information in the image 108. Image noise can originate in film grain or in electronic noise in the input device (e.g., digital camera) sensor and circuitry. Image noise can be, e.g., most apparent in images with low signal levels (e.g., dark or underexposed images).

When evaluated in a frequency domain representation, the noise can cause the noisy image 108 to appear to have more high frequency components than is actually the case. For example, the random variations in brightness or color can mimic image detail based on, e.g., the rapid changes in contrast or brightness over a small space. However, such pseudo high frequency image data does not make a face more recognizable, and can instead further distort a face. Therefore, high frequency image components can be an unreliable indication of an image detail level.

A detail detection processor 110 can be configured to perform detail detection processing. The detail detection processor 110 can be implemented by a computer executing instructions, logic circuitry, or a combination thereof. Detail detection processing can include receiving an image as input, determining the level of detail represented in the image, and providing information on the level of detail as output. The detail detection processor 110 can transform electronic information representing a digital image into other forms (e.g., new images) for ascertaining a detail level.

A detail detection result 112 can be output by the detail detection processor 110 and can indicate the level of detail in an image. In some implementations, the detail detection result 112 can be one of an enumerated list of options (e.g., "High," "Med," or "Low," or "True," or "False"). In some other implementations, the detail detection result 112 can be a number representing the level of image detail on a given scale (e.g., 1-10, 1-1000, or 0.0-1.0). Any value or representation can be utilized to indicate the level of detail detected in an image.

In operation, an image, such as the blurry image 104, can be input to the detail detection processor 110. Further, a corresponding detail detection result 112 can be output, which indicates the level of detail in the input. Based on the blurriness of the blurry image 104, the detail detection result 112 can reflect a detail level of medium (i.e., "Med"). A clear image 106 also can be input to the detail detection processor 110. Based on the sharpness of the clear image 106, the detail detection processor 110 can determine the detail level to be high 112. Similarly, it can be determined based on lack of detail that the unclear image 102 has a low detail level 112 and that the noisy image 108 has a low detail level 112.

Figure 2:
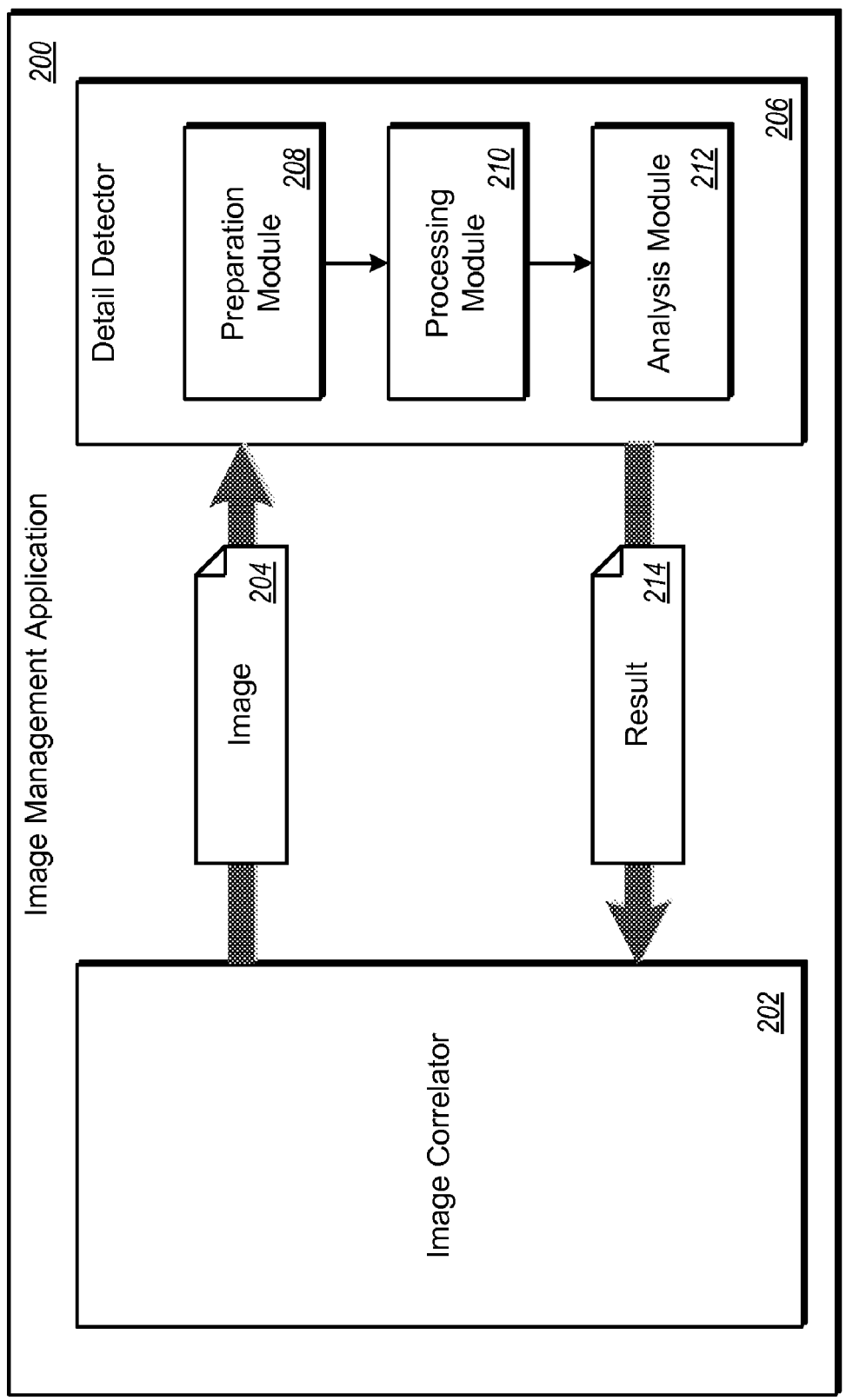
FIG. 2 shows an exemplary image management application for detecting image detail levels.

In general, as shown in FIG. 2, a system can include a component that receives as input an image and generates a result indicating the level of detail of the image.

FIG. 2 shows an exemplary image management application 200 for detecting image detail levels. The image management application 200 can be a software application executing on a computer system. The image management application 200 can access resources of the computer system (e.g., memory or disk storage) via an operating system or application platform. The image management application 200 can include a user-interface through which the image management application 200 receives input from a user and displays output to the user. Although shown as a single application, in some implementations the functionality of the image management application 200 can be accomplished using multiple applications.

The image management application 200 can include software systems or modules, such as an image correlator 202 and a detail detector 206. The image management application 200 can enable software components to exchange information. The software components can be independent processes (e.g., threads) operating within the image management application 200, remote functions (e.g., invoked using a remote procedure call), or local functions (e.g., methods or procedures) called by a control process of the image management application 200.

An image correlator 202 can be an application, process, or system component configured to correlate images. For example, the image correlator 202 can correlate images of a same individual using facial detection and facial recognition functionality. Further, the image correlator 202 can, e.g., have confidence levels for the facial detection and the facial recognition functions. As part of assessing a confidence level, the image correlator 202 can use reliability indications (e.g., a detail-level result 214 generated by the detail detector 206).

An input image 204 represents a digital image. For example, the input image 204 can be data stored in memory or a file system according to a format (e.g., bitmap, pixmap, vector graphics, compressed, or uncompressed). The input image 204 can be transferred from the image correlator 202 to the detail detector 206, e.g., by value or by reference. Transferring by value can include copying the input image 204 to an area of memory for use by the detail detector 206. Transferring by reference can include passing only a reference (e.g., a memory or file pointer) for the image data to the detail detector 206. The detail detector 206 can thus access the image from a location common to the image correlator 202.

The detail detector 206 can be an application, process, or system component configured to detect the level of detail of an input image 204 received from another application, process, or system component, such as the image correlator 202. The detail detector 206 can be configured to detect details and detail levels in input images, such as the input image 204, having certain characteristics. For example, images input to the detail detector 206 can depict faces having an approximate size relative to the input image 204. The characteristics can provide information that enables the detail detector 206 to use more sophisticated techniques in detecting detail levels than possible absent the information. For example, if input images share a characteristic of being produced via facial detection, an appropriate scale for measuring sharpness can be determined. Thus, in an extension of the example, an amount of an input image 204 that is expected to correspond to eyes can represent the scale by which eye sharpness is measured.

In some implementations, in addition to an input image 204, the detail detector 206 also can receive one or more locations relative to the input image 204 of depicted features. For example, the detail detector 206 can receive coordinates of eyes, a nose and a mouth depicted in the input image 204 relative to a face. The detail detector 206 can use the locations (e.g., coordinates) to improve the accuracy of detail level detection, such as by processing the received locations differently than other locations.

In a first example, the detail detector 206 can weigh a detail level of a received eye location more highly than other areas of the input image 204 in determining an overall detail level. In a second example, the detail detector 206 can employ a distinct technique for detecting detail of a received eye location than for other non-eye locations (e.g., blurring the received eye location a different amount, or using a different blurring technique). In a third example, a portion (e.g., a slice) of an input image 204 can be extracted based on a received eye or nose location. The portion can be transformed to a frequency domain representation using, e.g., a fast Fourier transform (FFT), or fast wavelet transform (FWT). Using, e.g., pattern recognition, the transformed portion can be analyzed to determine whether the portion exhibits characteristics to be expected based on the portion corresponding to, e.g., an eye or nose depiction.

The detail detector 206 can generate an output result 214 based on processing of the input image 204. The detail detector 206 can provide the output result 214 to the image correlator 202. The output result 214 can be an indication of the level of detail in the input image 204. For example, the output result 214 can be one option from an enumerated list of options (e.g., "High," "Med," or "Low"). Alternatively, the output result 214 can be a number representing the image detail level on a given scale.

The output result 214 also can include an indication of a likelihood the input image 204 depicts a particular object, such as a face. For example, the locations received by the detail detector 206 can be used in determining the likelihood the input image 204 depicts a face. The detail detector 206 can detect the detail level at locations indicated as facial features (e.g., eyes, nose, and mouth) as a basis for determining the input image 204 depicts a face.

In some implementations, the detail detector 206 can include three phases or modules, such as a preparation module 208, a processing module 210 and an analysis module 212. In some other implementations, other configurations of modules and phases can be used to the same end.

Figure 3A:
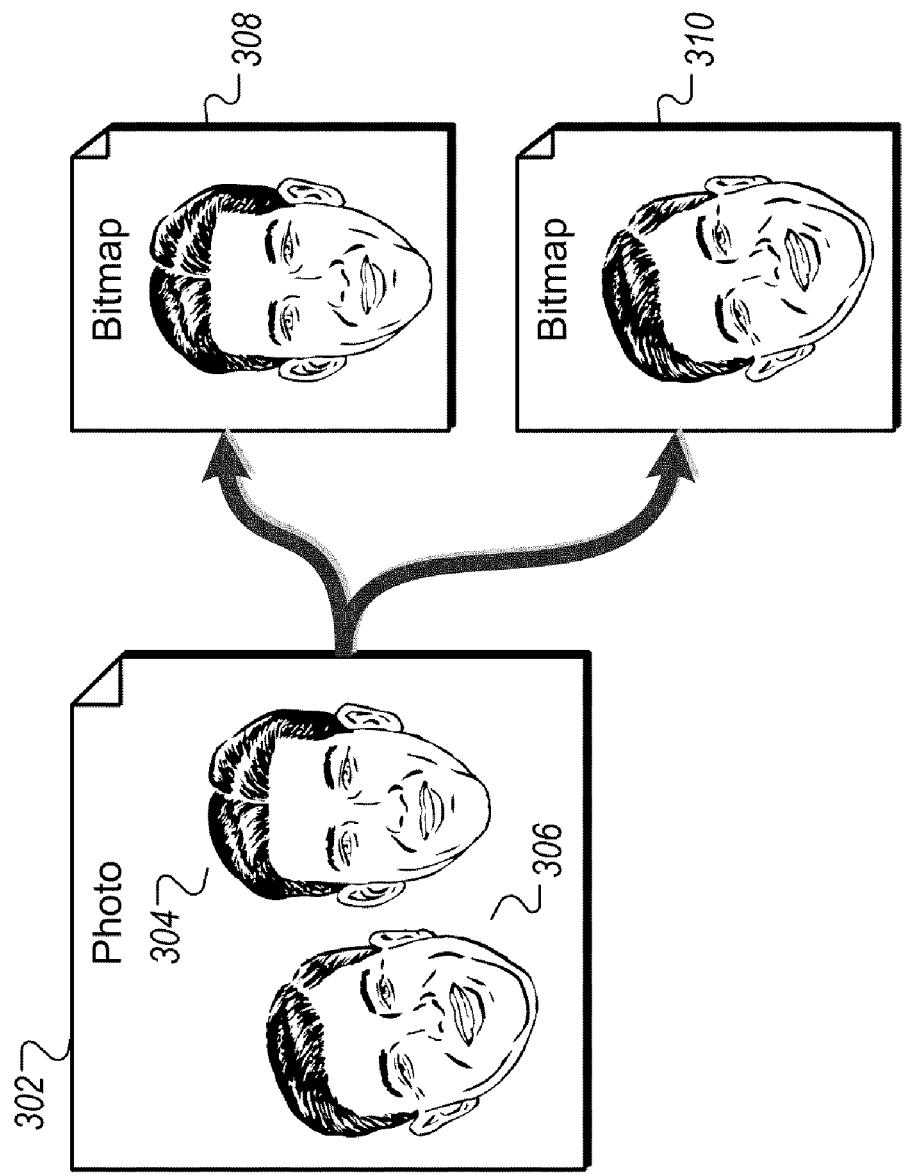
FIG. 3A is a diagram showing an exemplary extraction of portions of an image.
Figure 3B:
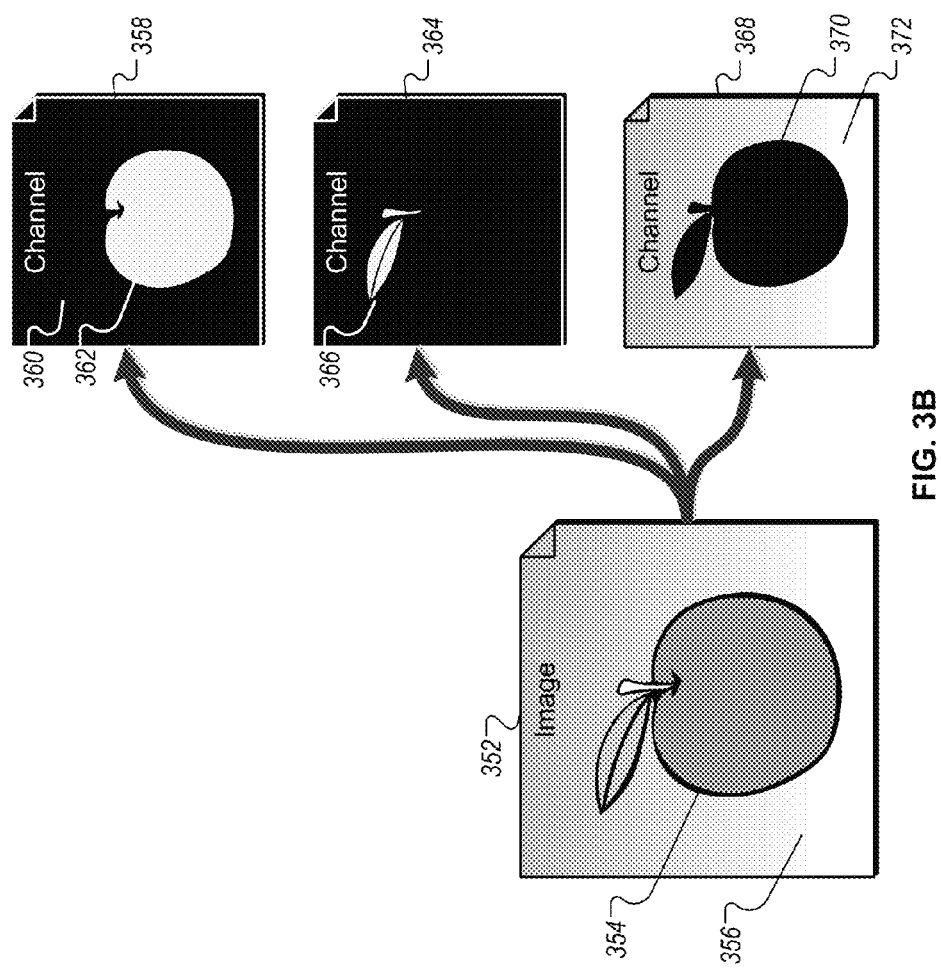
FIG. 3B is a diagram showing an exemplary extraction of channels of an image.

The preparation module 208 can prepare the input image 204 for detail detection by, e.g., extracting selected areas of the input image 204 or extracting certain image data (see FIGS. 3A and 3B). The preparation module 208 also can reduce the color depth of the input image 204. For example, the input image 204 can initially have a 16- or 24-bit color depth. The preparation module 208 can convert the input image 204 to an 8-bit color depth by decomposing the image into grayscale color channels and discarding all but one of the channels. The perceptible level of detail can be the same using an 8-bit depth as at a higher depth. The operations of the preparation module 208 can alternatively be performed in part or whole in the image correlator 202.

Figure 4:
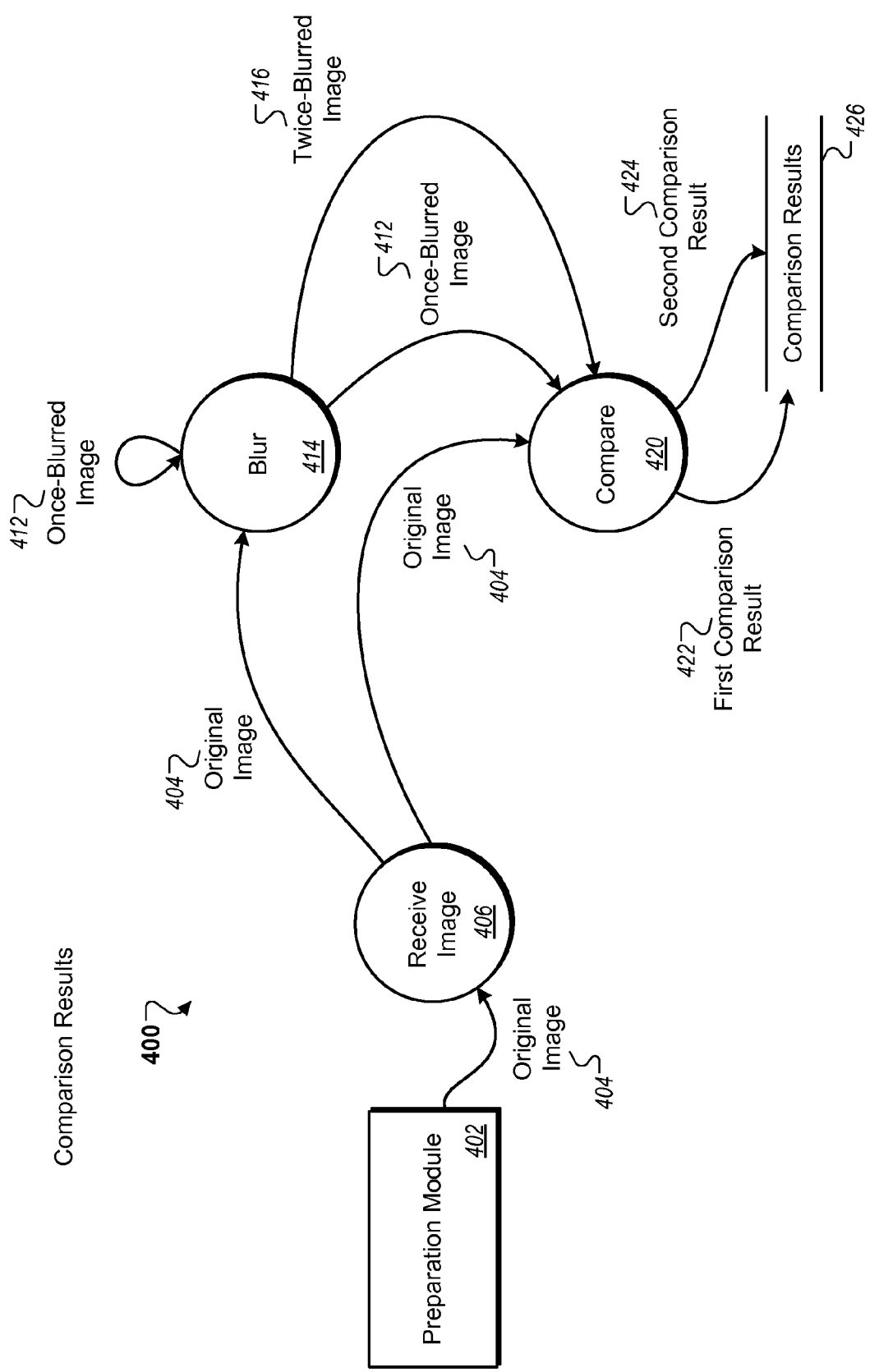
FIG. 4 is a dataflow diagram showing an exemplary detail detection dataflow.

A processing module 210 can, e.g., transform the input image 204 to produce new images and then compare the images (see FIG. 4). An analysis module 212 can, e.g., determine an overall image detail level based at least in part on the results produced by comparing the images in the processing module 210.

In general, as shown in FIGS. 3A and 3B, original images can be transformed to produce new images. For example, one or more portions of an original image can be extracted. A portion can correspond to an area of an image. A portion also can correspond to some subset of the visual information represented by an image (e.g., a channel). The new images can be prepared as part of determining an image detail level.

FIG. 3A is a diagram showing an exemplary extraction of portions of an image. A photograph 302 can be a digital image depicting multiple subjects. For example, the photograph 302 can include depictions of a first face 304 and a second face 306. Image detail level detection can be performed on a portion of a photograph substantially including only a face. Thus, one or more portions of a photograph can be extracted, such that each portion corresponds to an area of the photograph that substantially depicts only a face. The portions (e.g., the first portion 308 and the second portion 310 of the photograph 302) to be extracted can be identified by a facial detection operation or other such processing. Further, the identified portions can be extracted from the photograph 302 using standard image portioning techniques, such as cropping. The extracted portions (e.g., the first portion 308 and the second portion 310) can be provided to or as part of a detail detection operation.

FIG. 3B is a diagram showing an exemplary extraction of channels of an image. A color digital image 352 can be composed of pixels. Pixels can be represented using a combination of primary colors (e.g., red, green and blue). A channel can be a representation (e.g., a grayscale image) of one of the primary colors (e.g., green) in the color digital image 352. A channel can be stored relative to an image or extracted from the image data. Further, a channel can be the same size and resolution as the original image.

The color digital image 352 can be, e.g., a digital photograph depicting an apple 354. The apple 354 can be represented using one or more shades of red and further can include a green leaf. The background 356 of the color digital image 352 can be one or more shades of blue.

A red channel 358 corresponding to the color digital image 352 can represent the intensity of the red component. For example, a black field 360 in the red channel 358 can indicate that no red component is present in the corresponding portion of the color digital image 352. In contrast, the red portion of the apple 354 can appear as a bright area 362 in the red channel 358.

Similarly, a green channel 364 can include a bright area 366 representing the leaf portion of the apple 354. The bright area 366 indicates that the corresponding area of the color digital image 352 includes a green component.

A blue channel 368 corresponding to the color digital image 352 can include a black region 370 corresponding to the apple and leaf, indicating the lack of a blue component in the region. The background 372, however, can be bright in the blue channel 368 indicating the color digital image 352 includes a blue background.

In general, as shown in FIG. 4, part of determining a detail level of an image can be generating blurred images from the image and comparing the image and blurred images. The comparison can reveal the amount of image detail lost through successive blurs. The amount lost, and rate of loss as judged from successive blur to successive blur, can be an indication of the original detail level of the image. A more accurate detail level can be determined by generating multiple blurred images. In addition, analysis of comparison results (e.g., as described with respect to FIGS. 5A-D and 6) can further facilitate an accurate detail level determination.

FIG. 4 is a dataflow diagram showing an exemplary detail detection dataflow 400. The dataflow 400 shows the flow (e.g., movement or use) of data between terminators, processes and data stores.

A preparation module 402 can be a software module that provides input of an original image 404 to the dataflow 400. The preparation module 402 can be, e.g., the preparation module 208 or the image correlator 202 shown in FIG. 2. In some implementations, as part of the preparation module 402, portions of an image can be extracted to produce the original image 404 (e.g., substantially depicting only a single face as shown in FIG. 3A). In some implementations, as part of the preparation module 402, one or more color channels of an image can be extracted to produce the original image 404 (e.g., a green channel as shown in FIG. 3B).

The receive image process 406 can receive the original image 404 as input from the preparation module 402. The input can be a result of a programmatic call (e.g., for a method or procedure embodying, among other functionality, the receiving image process 406). The receive-image process 406 can be implemented as a part or whole of a software module (e.g., the processing module 210, in FIG. 2). The receive-image process 406 can include, e.g., initializing memory for storing the original image 404 or a reference to a memory location where the original image 404 is stored.

The blur process 414 can receive the original image 404 as input from the receive image 406 process and output a once-blurred image 412. The once-blurred image 412 can be generated by blurring the original image 404. The blur process 414 also can receive the once-blurred image 412 as input. The blur process 414 can blur the once-blurred image 412 to generate the twice-blurred image 416.

The blur process 414 can blur an image using various techniques. For example, the blur process 414 can include a two-dimensional convolution operation using, e.g., a box convolution kernel. Convolution kernels (i.e., pixel masks) can feature an odd number of rows and columns in the form of a square (e.g., 3×3 convolution kernel). The center of a kernel can correspond to the pixel being convolved and can be referred to as the target pixel. The number of positions from the center to the edge of a kernel can be referred to as the kernel radius. For example, a 3×3 kernel can be referred to as a kernel with a radius of one.

Each pixel of the original image 404 can be individually convolved. The products of the numbers in the kernel and the respective corresponding pixels can be summed, and the sum can be substituted for the value of the target pixel. The sum of products can be outside the range of values with which a pixel is represented. In such instances, the sums corresponding to each of the pixels can be normalized to the appropriate range.

The resolution of the original image 404 can be used to determine the number of blurred versions to generate and to specify the characteristics of the convolution kernels used in generating the blurred versions. Various combinations of number of blurred versions and convolution kernels can produce desirable results. For example, if an original image 404 has a high resolution (e.g., height or width of 512 pixels), either or both of larger convolution kernels (e.g., 7×7 instead of 3×3) or a higher number of blurred versions (e.g., 7 instead of 5) can be used to compensate for the higher resolution.

Compensation can account for absolute differences in size of small details in a high-resolution versus low-resolution image. For example, a high-resolution (e.g., 192×256 pixels) image can include a representation of a person's eye accounting for 1% of the image (e.g., 36×14 pixels). Similarly, a low-resolution (e.g., 48×64 pixels) image can include a representation of a person's eye accounting for 1% of the image (e.g., 9×3 pixels). Blurring both images with a 1-pixel-radius blur (e.g., a 3×3 convolution kernel) can result in the loss of far more detail in the low-resolution image than the high-resolution image based on the relative sizes of blur radius and eye representations.

One compensation approach is to blur images with increasingly larger kernels up to a given percentage (e.g., 10%, 25% or 50%) of the image size (e.g., height or width). For example, an image can have a height of 256 pixels. The image can be blurred with a convolution kernel having a radius of 1 (e.g., a 3×3 kernel), 2 (e.g., a 5×5 kernel), 4 (e.g., a 9×9 kernel) and so forth up to 64, or 25% of the height. Thus, the result can be 7 blurred versions of the image corresponding to the kernels applied (e.g., radii of 1, 2, 4, 8, 16, 32, and 64).

In addition to compensating for varying resolutions, using kernels of increasing size can improve the detail level information produced through image comparisons. For example, larger kernels (e.g., radii of 16 or 32) can result in comparisons revealing information about lower-frequency image information than smaller kernels (e.g., radii of 1 or 2).

The size and arrangement of convolution kernels used in the blur process 414 to blur images (e.g., the original image 404 and once-blurred image 412) can vary. TABLE 1 shows two exemplary approximate Gaussian-blur kernels. As discussed, successive blurs can be performed using kernels of increasing size. For example, the original image 404 can be blurred using a 3×3 kernel (e.g., as shown in TABLE 1), the once-blurred image 412 can be blurred using a 5×5 kernel (e.g., as shown in TABLE 1), and so forth. The increasingly larger kernels also can be sparsely expanded as shown in exemplary kernels in TABLE 2. Using sparse kernels of increasing size to successively blur an image can result in a final blurred image that is equivalent to an image blurred with a large continuous kernel. However, images representing stages of blurring can be produced without substantially adding computational expense.

TABLE 1

Exemplary convolution kernels

| 3 × 3 Kernel | | | 5 × 5 Kernel | | | | |
|---|---|---|---|---|---|---|---|
| 1 | 2 | 1 | 1 | 2 | 3 | 2 | 1 |
| 2 | 4 | 2 | 2 | 4 | 6 | 4 | 2 |
| 1 | 2 | 1 | 3 | 6 | 9 | 6 | 3 |
|   |   |   | 2 | 4 | 6 | 4 | 2 |
|   |   |   | 1 | 2 | 3 | 2 | 1 |

TABLE 2

Exemplary sparse convolution kernels

| 3 × 3 Kernel | | | 5 × 5 Kernel | | | | |
|---|---|---|---|---|---|---|---|
| 1 | 2 | 1 | 1 | 0 | 2 | 0 | 1 |
| 2 | 4 | 2 | 0 | 0 | 0 | 0 | 0 |
| 1 | 2 | 1 | 2 | 0 | 4 | 0 | 2 |
|   |   |   | 0 | 0 | 0 | 0 | 0 |
|   |   |   | 1 | 0 | 2 | 0 | 1 |

The compare process 420 can receive images as input and compare the differences between the images to derive a comparison result output (e.g., a first comparison result 422). The compare process 420 can be a binary process in which two input images are compared to produce a single comparison result output. For example, the compare process 420 can compare the original image 404 and once-blurred image 412 to derive the first comparison result 422. The compare process 420 also can compare the once-blurred image 412 and twice-blurred image 416 to derive the second comparison result 424.

In addition to varying the number of blurred versions of an image produced and the size of convolution kernels, resolution differences can be addressed by deriving fewer comparison results 426, or by using less than all of the derived comparison results 426. For example, the number of times an image is blurred can be constant or substantially constant regardless of resolution. Thus, a lower resolution image (e.g., 36×48) can be blurred using kernels having radii of 1, 2, 4, and so forth up to 32. A higher resolution image (e.g., 225×300) can be blurred using kernels of the same radii. For the lower resolution image, comparison results can be generated only for the first several blurred versions, excluding the version generated with a kernel radius of 32. For the higher resolution image, comparison results can be generated only for the last several blurred versions, excluding the version generated with a kernel radius of one. Alternatively, the comparison results discussed can be derived but then not used subsequently in determining the overall image detail level. Selectively not deriving or using comparison results as part of the image detail level analysis can improve the accuracy over always deriving or using all comparison results.

The compare process 420 can compare images using one or more of a variety of metrics. For example, the compare process 420 can use a sum of absolute differences (SAD). The SAD can be generated by summing the absolute values of the differences between each pixel value in a first image (e.g., the original image 404) and each pixel value in a second image (e.g., the once-blurred image 412). In other implementations, the SAD can be replaced or used in conjunction with a sum of absolute transformed differences, sum of squared differences, rate-distortion optimization, root mean square error, peak signal-to-noise ratio, or other such metrics.

Comparison results 426 can be a store of comparison results (e.g., the first comparison result 422). The comparison results 426 can be represented as variables stored in memory during program execution or as values stored in a database or file system. The comparison results 426 can correspond to band pass information relating to the amount of information in an image corresponding to various frequency bands, such as is discussed with respect to FIGS. 5A-D.

In general, as shown in FIGS. 5A-D, graphical information in images, which is often represented in the spatial (or image) domain, also can be represented in the frequency domain. Information in an image can correspond to various frequencies. Band pass information can represent the amount of information in an image corresponding to frequency bands (or ranges). For example, the highest frequency band of an image can represent the finest details in an image (e.g., high-contrast edges such as between the sclera and the iris of an eye). The lowest frequency band can represent, e.g., the general shapes depicted in an image. The relationships between the bands can indicate the detail level of an image. However, situations can arise in which the relationships alone between the bands can indicate erroneous detail levels.

Band pass information can be estimated using various techniques such as transforming an image from the spatial domain to a frequency domain using, e.g., a fast Fourier transform (FFT), or by successively blurring an image and comparing the various images produced by each successive blur with the previous image (e.g., as in the blur process 414 and compare process 420, in FIG. 4) to determine the amount of detail lost through each blur.

Figure 5B:
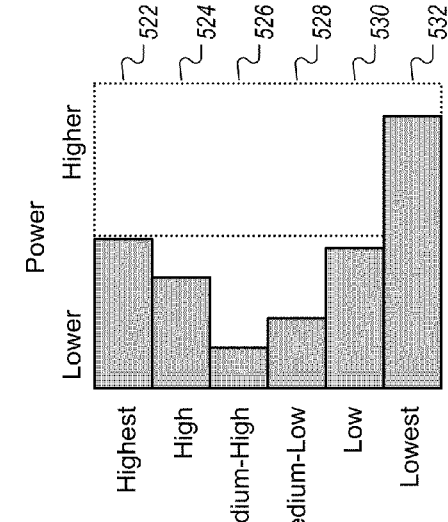
FIG. 5B is a bar chart representing band pass information corresponding to a blurry image distorted by random noise artifacts.
Figure 5D:
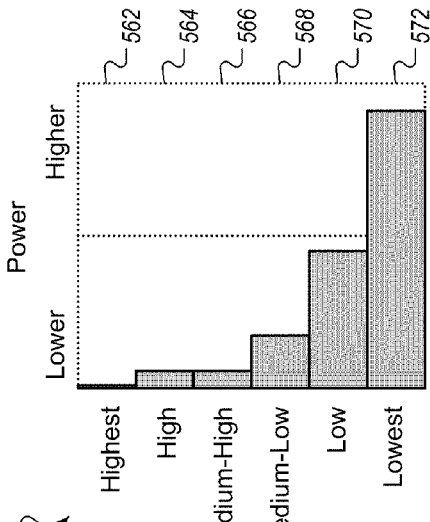
FIG. 5D is a bar chart representing band pass information corresponding to a blurry image.
Figure 5A:
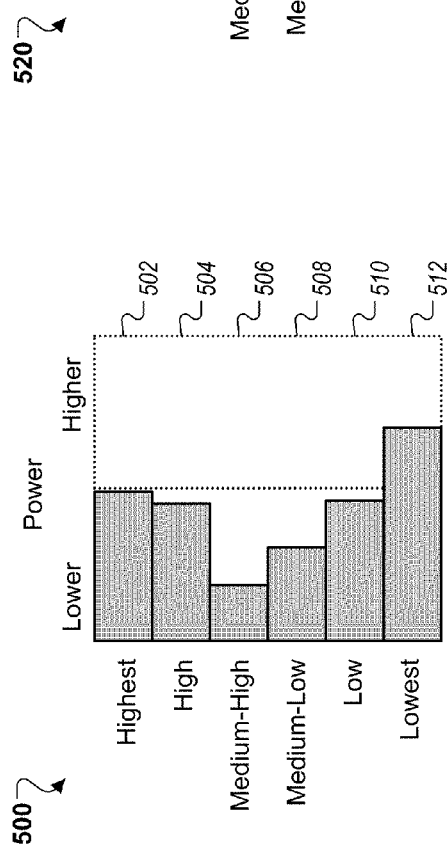
FIG. 5A is a bar chart representing band pass information corresponding to a sharp image.

FIG. 5A is a bar chart 500 representing band pass information corresponding to a sharp image. The amount of information in an image corresponding to a frequency range increases from left to right. The exemplary bars shown can represent a logarithmic scale. The vertical axis of the bar chart 500 represents frequency ranges increasing from the bottom to the top of the bar chart 500.

The highest 502 and high 504 frequency bands show that the sharp image includes corresponding image components. The components can be high contrast shifts over short spatial distances and can result from representations of, e.g., fine details and clear visual differences between objects depicted in an image, such as strands of hair or individual eyelashes. The amount of information in the frequency bands drops off in the medium-high 506 band. The medium-low 508, low 510 and lowest 512 frequency bands represent that the sharp image includes graphical information corresponding to, e.g., general shapes and varying levels of brightness.

Although the amount of information corresponding to the lower frequencies is high in the sharp image, the ratio between the low and high frequency components nevertheless reveals the image to have a relatively high level of detail. For example, the overall image detail could be determined by comparing each of the higher frequencies to find the lowest of the three (e.g., the medium-high 506 frequency), and dividing that value by the highest of the lower frequencies (e.g., the lowest 512 frequency). Using this approach, the ratio of the amounts of high frequency to low frequency information can be 0.27.

FIG. 5B is a bar chart 520 representing band pass information corresponding to a blurry image distorted by random noise artifacts. The highest 522 and high 524 frequency bands have similar levels to those of the sharp image in FIG. 5A. The noise artifacts, being small, high-contrast changes in the image domain, can mimic image details. However, because the image is actually blurry, the amount of information in the image in the higher frequency bands quickly tapers off from the highest 522 to the medium-high 526 frequency band. From this low point, the amount of information associated with the medium-low 528, low 530 and lowest 532 bands quickly increases to a very high level, relative to the sharp image in FIG. 5A. Using the same approach discussed, the ratio between the lowest amount of information of the higher frequency bands (e.g., the medium-high 526 frequency) and the highest of the lower frequency bands (e.g., the lowest 532 frequency) can be 0.16. Thus, despite some similarities with the amount of information levels of the frequency bands of the sharp image in FIG. 5A, the ratio nonetheless reveals a distinct difference between detail levels of the two images.

Figure 5C:
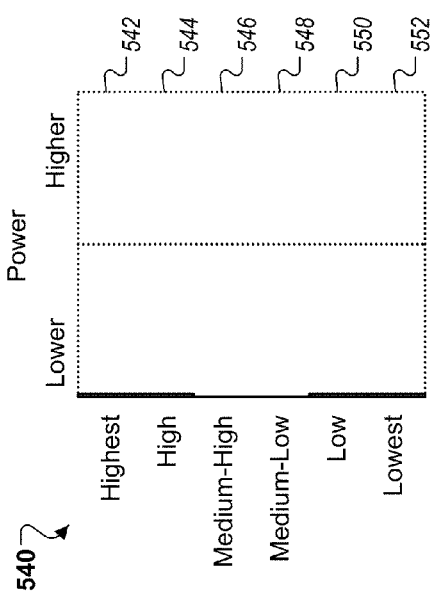
FIG. 5C is a bar chart representing band pass information corresponding to a substantially blank image.

FIG. 5C is a bar chart 540 representing band pass information corresponding to a substantially blank image. The amount of information of the highest 542, high 544 and medium-high 546 frequency bands is substantially imperceptible. Similarly, the amount of information of the medium-low 548, low 550 and lowest 552 frequency bands is substantially imperceptible. However, a ratio between the amount of information of the lowest higher frequency band (e.g., the medium-high 546 frequency) and the highest lower frequency band (e.g., the low 550 frequency) can result in an erroneous determination the image has a high detail level. For example, if the amount of information of the medium-high 546 frequency is half that of the low 550 frequency, the ratio could be 0.5—seemingly sharper than the sharp image in FIG. 5A. However, based on the very low amount of information of the lower frequencies, it can be determined that the image does not include sufficient information to convey any depictions. Thus, a threshold for a minimum amount of information for the lower frequency bands can be applied for such situations. For example, the three lower frequency band levels can be compared with a default minimum value representing a low threshold. If the default value is the higher than the other lower frequency band levels, the default value can be used in the ratio (e.g., avoiding an issue with dividing by zero).

FIG. 5D is a bar chart 560 representing band pass information corresponding to a blurry image. The amount of information of the highest 562, high 564 and medium-high 566 frequency bands is relatively very low (e.g., compared to the sharp image in FIG. 5A). In addition, the amount of information associated with the lower frequency bands increases rapidly from the medium-low 568, to low 570, to lowest 572 bands. The ratio between the lowest level of the higher frequency bands (e.g., the highest frequency 562) and the highest level of the lower frequency bands (e.g., the lowest 572 frequency) can be less than one tenth of the ratio associated with the sharp image in FIG. 5A at 0.02. The very small ratio can indicate the image is unrecognizably blurry.

Figure 6:
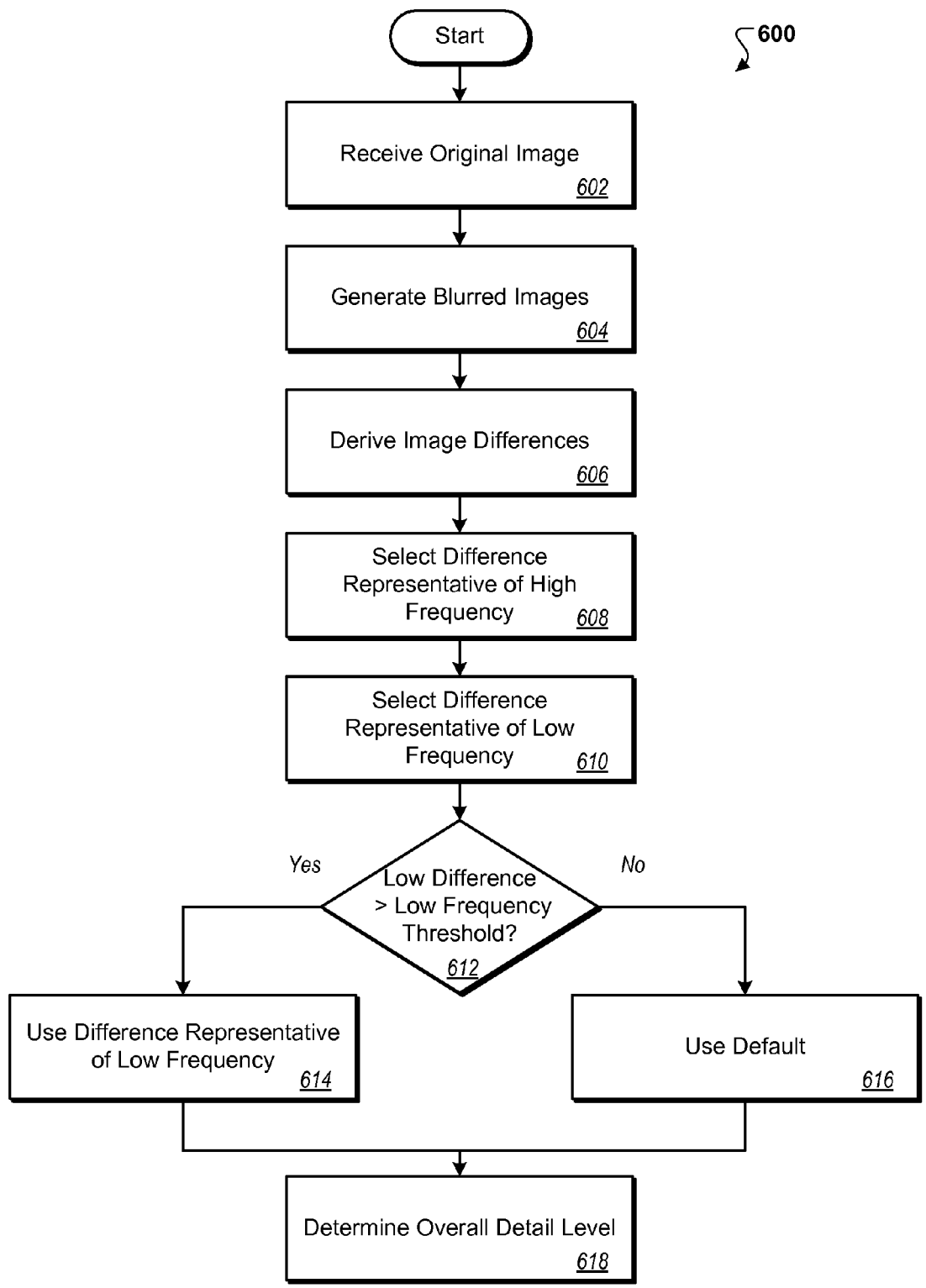
FIG. 6 is a flow chart showing an exemplary process for detecting image level detail.

In general, as shown in FIG. 6, an image detail level can be determined by successively and cumulatively transforming an image, comparing the resulting images, and using the comparison differences to determine an overall image detail level.

FIG. 6 is a flow chart showing an exemplary process 600 for detecting image level detail. The process 600 can be performed by a processor configured to execute a software application for managing images. The processor can receive an original image (602), such as from the preparation module 402, in FIG. 4, or the image correlator 202, in FIG. 2. The processor can generate blurred images (604) in order to evaluate the amount of detail lost through successive blurs. The detail lost, or differences, between cumulatively blurred images can indicate an overall level of detail for the image.

The number of blurred images generated (604) can vary depending on the resolution of the original image. For example, convolution kernels of increasing size can be used for each successive and cumulative blur. The generation of blurred images can begin with a kernel having a radius of one and increase to a radius of, e.g., 10%, 25% or 50% of the image size. Image size can be based on the spatial area of the image (e.g., using the product of image dimensions) or linear size (e.g., the height plus the width, or the larger of the height or width). The increase in size of the convolution kernel can be exponential (e.g., radii of 1, 2, 4, 8, 16, 32 and so forth) or linear (e.g., radii of 1, 3, 5, 7, 9 and so forth). The starting size also can be determined based on the image size (e.g., a starting radius of 1 for images up to 64 pixels, and a starting radius of 4 for images over 384 pixels).

Thus, the number of blurred images generated (604) can depend on the threshold of maximum kernel size relative to an image size, the starting kernel size, the manner in which image size is determined, and the nature of the increase in size of successive kernels. For example, an original image can have dimensions of 256×192. The image size can be the larger of the height or width (i.e., 256). The size of kernels used for successive blurs can exponentially increase to 25% of the image size, or in this example, to a radius of 64. The kernel size can start with a radius of 1. Therefore, seven blurred images can be generated (604) with kernels having radii of 1, 2, 4, 8, 16, 32, and 64.

After generating blurred images, the processor can derive image differences (606). Deriving image differences (606) can be a binary operation in which a first image is compared to a second image to determine the amount of change brought about by the blurring. The deriving (606) can be repeated to compare the original to the first blurred image, the first blurred image to the second blurred image and so forth up to the last blurred image. Deriving image differences can correspond to the comparing process 420 described with respect to FIG. 4.

The number of image differences derived (606) can depend on the number of images generated (604). If, for example, the deriving (606) is a binary operation, and seven blurred images are generated (604), seven image differences can be derived (606) (e.g., by comparing the original to the first blurred image, the first blurred to second blurred, the second blurred to third blurred through the sixth blurred to seventh blurred).

The processor can select one or more derived differences that are representative of high frequency (608) components of the original image. High frequency image components can, e.g., relate to fine details and edges depicted in images. The processor can combine the one or more derived differences into a value representative of the high frequency components of the original image. The processor can select the one or more derived differences from a group of higher frequency differences (e.g., highest 502, high 504 and medium-high 506 frequencies in FIG. 5A). In some implementations, the group of higher frequency differences can be the differences derived from images generated with the smallest radius blurs relative to the set of images generated, such as the smallest 25%, 50% or 75% radii. In other implementations, the group of higher frequency differences can include some but exclude others of the differences derived from images generated with the smallest radius blurs. For example, the group of higher frequency differences can include differences derived from images generated with the smallest 50% of radius blurs but exclude outliers relative to a nonlinear comparison of the differences.

The processor can select (608) the one or more derived differences using various techniques. In some implementations, the processor can select a difference having the lowest value from the group of higher frequency differences. Selecting the difference having the lowest value can avoid errors caused, e.g., by one frequency band representing a disproportionately and deceptively high amount of information (e.g., as can be caused by image noise). In other implementations, the processor can adaptively select the one or more differences based on a linear or nonlinear comparison between the group of higher frequency differences. In still other implementations, the processor can select the one or more differences based on finding a curve to best fit the frequency levels. Characteristics of the curve (e.g., slope) can indicate differences to select or differences to not select.

The processor can select one or more derived differences that are representative of low frequency (610) components of the original image. Lower frequency image components can, e.g., relate to the general shapes depicted in an image. The processor can combine the one or more derived differences into a value representative of the low frequency components of the original image. The processor can select the one or more derived differences from a group of lower frequency differences (e.g., medium-low 508, low 510 and lowest 512 frequencies in FIG. 5A). In some implementations, the group of lower frequency differences can be the differences derived from images generated with the largest radius blurs relative to the set of images generated, such as the largest 25%, 50% or 75% radii. In other implementations, the group of lower frequency differences can include some but exclude others of the differences derived from images generated with the largest radius blurs. For example, the group of lower frequency differences can include differences derived from images generated with the largest 50% of radius blurs but exclude outliers relative to a nonlinear comparison of the differences.

The processor can select (610) the one or more derived differences using various techniques. In some implementations, the processor can select a difference having the highest value from the group of lower frequency differences. Selecting the highest difference can avoid errors caused, e.g., by one of the lower frequency bands representing a deceptively low amount of information, distorting the ratio of low to high frequency image components. In other implementations, the processor can adaptively select the one or more differences based on a linear or nonlinear comparison between the group of lower frequency differences.

The processor can determine (612) whether the difference representative of the low frequency components is greater than a certain low frequency threshold. The low frequency threshold can be a constant value that represents a low, non-zero level of lower frequency detail. For example, if the amount of information associated with each of the lower frequency bands is very low, the image can lack sufficient information to effectively represent anything (e.g., being substantially blank). In such a situation, the ratio between the low and high frequency image components can be irrelevant. Using a default, low but non-zero, low frequency difference (616) can prevent division by zero in a ratio in which the low frequency difference is the denominator. Use of a default low frequency difference (616) also can allow a ratio between high and low frequency differences to go to zero or substantially zero when the high frequency differences are zero or substantially zero.

If the processor determines (612) that the difference representative of the low frequency components is greater than the low frequency threshold, the processor can use the difference representative of the low frequency components (614) rather than a default low frequency.

With the difference representative of the low frequency components and the difference representative of the high frequency components, a ratio can be calculated as part of determining an overall image detail level (618).

FORMULA 1. can be an exemplary formula for determining an overall detail level (L). A min function can select a lowest of a series of values. A max function can similarly select a highest of a series of values. $D_1$ can be a difference between an original image and a first blurred image. $D_1$ can represent the highest frequency image components. $D_2$ can be a difference between a first blurred image and a second blurred image. $D_3$, $D_4$, $D_5$, and $D_6$ can represent differences corresponding to image components of decreasing frequency. Finally, C can be a constant value (e.g., 3.0) that represents an objectively low, but non-zero, difference. Thus, the max function selecting C can indicate $D_4$, $D_5$, and $D_6$ are all lower than C and that the corresponding image is substantially blank.

$$L = \frac{\min(D_1, D_2, D_3)}{\max(D_4, D_5, D_6, C)}. \quad \text{FORMULA 1}$$

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method for detecting a detail level of an image, the method comprising:
   receiving an original image;
   transforming the original image to generate one or more blurred images;
   deriving image differences corresponding to ranges of detail frequency of the original image based, at least in part, on the one or more blurred images and the original image, such that the derived image differences comprise a high frequency difference, a medium-high frequency difference, a medium-low frequency difference, and a low frequency difference; and
   determining, based on the image differences, a detail level value corresponding to the original image, at least in part, by dividing a lowest high frequency value selected from the high frequency difference and the medium-high frequency difference by a highest low frequency value selected from the medium-low frequency difference, the low frequency difference, and a constant value representing substantially zero frequency difference.

2. The computer-implemented method of claim 1, wherein generating the one or more blurred images comprises generating blurred images by successively and cumulatively transforming the original image.

3. The computer-implemented method of claim 1, wherein transforming the original image comprises convolving the original image using a kernel configured to blur an image.

4. The computer-implemented method of claim 1, wherein deriving the image differences comprises:
   averaging absolute corresponding pixel differences between one of the one or more blurred images and the original image.

5. The computer-implemented method of claim 1, wherein deriving the image differences comprises:
   comparing single color channels of the one or more blurred images and the original image.

6. The computer-implemented method of claim 1, further comprising providing the detail level value to an image management application.

7. The computer-implemented method of claim 6, wherein:
   the original image is received from the image management application; and
   the provided detail level value indicates a likelihood of the original image depicting a face recognizable by the image management application.

8. A computer program product, tangibly encoded on a computer-readable medium, operable to cause data processing apparatus to perform operations comprising:
   receiving an original image;
   transforming the original image to generate one or more blurred images;
   deriving image differences corresponding to ranges of detail frequency of the original image based, at least in part, on the one or more blurred images and the original image, such that the derived image differences comprise a high frequency difference, a medium-high frequency difference, a medium-low frequency difference, and a low frequency difference; and
   determining, based on the image differences, a detail level value corresponding to the original image, at least in part, by dividing a lowest high frequency value selected from the high frequency difference and the medium-high frequency difference by a highest low frequency value selected from the medium-low frequency difference, the low frequency difference, and a constant value representing substantially zero frequency difference.

9. The computer program product of claim 8, wherein generating the one or more blurred images comprises generating blurred images by successively and cumulatively transforming the original image.

10. The computer program product of claim 8, wherein transforming the original image comprises convolving the original image using a kernel configured to graphically blur an image.

11. The computer program product of claim 8, wherein deriving the image differences comprises:
    comparing single color channels of the one or more blurred images and the original image.

12. The computer program product of claim 8, where the operations further comprise providing the detail level value to an image management application.

13. The computer program product of claim 12, wherein:
    the original image is received from the image management application; and
    the provided detail level value indicates a likelihood of the original image depicting a face recognizable by the image management application.

14. The computer program product of claim 8, wherein deriving the image differences comprises:
    averaging absolute corresponding pixel differences between one of the one or more blurred images and the original image.

15. A system comprising:
    one or more computers operable to perform operations comprising:
    receiving an original image;
    transforming the original image to generate one or more blurred images;
    deriving image differences corresponding to ranges of detail frequency of the original image based, at least in part, on the one or more blurred images and the original image, such that the derived image differences comprise a high frequency difference, a medium-high frequency difference, a medium-low frequency difference, and a low frequency difference; and
    determining, based on the image differences, a detail level value corresponding to the original image, at least in part, by dividing a lowest high frequency value selected from the high frequency difference and the medium-high frequency difference by a highest low frequency value selected from the medium-low frequency difference, the low frequency difference, and a constant value representing substantially zero frequency difference.

16. The system of claim 15, wherein generating the one or more blurred images comprises generating blurred images by successively and cumulatively transforming the original image.

17. The system of claim 15, wherein transforming the original image comprises convolving the original image using a kernel configured to graphically blur an image.

18. The system of claim 15, wherein deriving the image differences comprises:
averaging absolute corresponding pixel differences between one of the one or more blurred images and the original image.

19. The system of claim 15, wherein deriving the image differences comprises:
comparing single color channels of the one or more blurred images and the original image.

20. The system of claim 15, further comprising an image management application, where the one or more computers are operable to execute the image management application, and
the operations further comprise providing the detail level value to the image management application.

21. The system of claim 20, wherein:
the original image is received from the image management application; and
the provided detail level value indicates a likelihood of the original image depicting a face recognizable by the image management application.

* * * * *